United States Patent
Ebrahimi Afrouzi et al.

(10) Patent No.: US 11,121,567 B2
(45) Date of Patent: Sep. 14, 2021

(54) MOBILE ROBOT CHARGING STATION

(71) Applicants: Ali Ebrahimi Afrouzi, San Jose, CA (US); Michael Patrick Phillips, San Francisco, CA (US)

(72) Inventors: Ali Ebrahimi Afrouzi, San Jose, CA (US); Michael Patrick Phillips, San Francisco, CA (US)

(73) Assignee: AI Incorporated, Toronto (CA)

( * ) Notice: Subject to any disclaimer, the term of this patent is extended or adjusted under 35 U.S.C. 154(b) by 589 days.

(21) Appl. No.: 15/917,096

(22) Filed: Mar. 9, 2018

(65) Prior Publication Data

US 2019/0280497 A1 Sep. 12, 2019

(51) Int. Cl.
*H02J 7/00* (2006.01)
*H01M 10/44* (2006.01)
*H01M 50/50* (2021.01)

(52) U.S. Cl.
CPC .......... *H02J 7/0027* (2013.01); *H01M 10/44* (2013.01); *H01M 50/50* (2021.01); *H02J 7/0044* (2013.01); *G05D 2201/02* (2013.01); *G05D 2201/0215* (2013.01); *H02J 2310/22* (2020.01); *H02J 2310/48* (2020.01); *Y02E 60/10* (2013.01)

(58) Field of Classification Search
CPC ...... H02J 7/0027; H02J 7/0044; H01M 10/44; H01M 2/20; G05D 2201/02

USPC .......................................................... 320/107
See application file for complete search history.

(56) References Cited

U.S. PATENT DOCUMENTS

| | | | |
|---|---|---|---|
| 6,966,525 B1* | 11/2005 | Schroeder | B64D 39/00 244/135 A |
| 7,332,890 B2 | 2/2008 | Cohen et al. | |
| 7,430,462 B2 | 9/2008 | Chiu et al. | |
| 8,352,114 B2 | 1/2013 | More et al. | |
| 8,688,271 B2 | 4/2014 | Li et al. | |
| 2007/0141860 A1* | 6/2007 | Hernandez | H01F 38/14 439/38 |
| 2008/0065266 A1* | 3/2008 | Kim | G05D 1/0225 700/245 |
| 2008/0174268 A1 | 7/2008 | Koo et al. | |
| 2010/0026239 A1 | 2/2010 | Li et al. | |
| 2010/0324736 A1 | 12/2010 | Yoo et al. | |
| 2011/0138214 A1 | 6/2011 | Tseng et al. | |
| 2012/0143428 A1 | 6/2012 | Kim et al. | |
| 2017/0008411 A1* | 1/2017 | Wu | B60L 11/1818 |
| 2017/0136881 A1* | 5/2017 | Ricci | B60L 5/005 |

* cited by examiner

*Primary Examiner* — Zixuan Zhou

(57) ABSTRACT

A compact charging station with minimal horizontal surface area onto which charging contacts are disposed capable of maintaining strong and steady contact between charging contacts of the charging station and charging contacts of the mobile robot. Charging contacts retract when not in to remain free of any dust and debris and protected from any damage when not in use.

24 Claims, 5 Drawing Sheets

MOBILE ROBOT CHARGING STATION

CROSS-REFERENCE TO RELATED APPLICATIONS

This application claims the benefit of provisional patent application No 62469122, filed Mar. 9, 2017 by the present inventors.

FIELD OF THE INVENTION

The present invention relates to mobile robots, and more particularly, to charging stations for mobile robots.

BACKGROUND OF INVENTION

Various types of mobile robots are used in residential and commercial settings to carry out routine tasks. These devices are often powered by rechargeable batteries that must be periodically charged. Various types of charging stations have been devised in prior art. Frequently, charging stations are designed with upward facing charging contacts onto which a mobile robot with charging contacts on the underside thereof may drive. In such models, the robot must drive onto the charging station with a high level of precision in order to ensure good contact between the charging contacts. Due to normal error, some percent of the time, a mobile robot will drive onto a charging station and not make proper contact with the charging contacts. This may render the mobile robot unusable at the next occasion for use and cause frustration for a user. Unprotected charging contacts risk being damaged or the collection of dust and debris which may inhibit charging performance. A need exists for a charging station that can ensure strong contact between the charging contacts of the mobile robot and charging station and that can protect the charging contacts of the charging station when not in use.

SUMMARY

The following presents a simplified summary of some embodiments of the invention in order to provide a basic understanding of the present invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented below.

It is a goal of the present invention to provide a compact charging station with minimal horizontal surface area onto which the charging contacts are disposed that is able to maintain strong contact between the charging contacts of the charging station and the charging contacts of the mobile robot through the use of magnetic charging contacts. The charging contacts of the proposed charging station also retract when not in use to ensure they remain free of any dust and debris and are protected from damage when not in use.

These and other features and advantages of the present invention will be apparent to those skilled in the art in view of the described embodiments with reference to the drawings, as provided below.

BRIEF DESCRIPTION OF THE DRAWINGS

Non-limiting and non-exhaustive features of the present invention are described with reference to the following figures, wherein like reference numerals refer to like parts throughout the various figures.

DETAILED DESCRIPTION OF THE INVENTION

The present invention will now be described in detail with reference to a few embodiments thereof, as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention discloses a compact charging station for recharging a battery of a mobile robot whereby the charging contacts of the charging station retract when not in use. The charging station is able to maintain strong contact between the charging contacts of the charging station and the charging contacts of the mobile robot using magnetic charging contacts.

The charging station has two retractable prongs onto which magnetic charging contacts are disposed such that the magnetic charging contacts face upward when the prongs are extended. In the preferred embodiment, the prongs retract and extend by rotating about a vertical axis such that the prongs lie in a horizontal plane. In another embodiment, the prongs retract and extend by rotating about a horizontal axis such that each prong lies in a vertical plane. Alternatively, the prongs may simply slide forwards and backwards rather than rotate out when entering and exiting the body of the charging station. When the charging station is not in charging mode the prongs are retracted within the main housing of the charging station. This ensures the charging contacts remain clean and protected from potential damage when not in use. When the charging station is in charging mode, the prongs extend outside of the main housing of the charging station. The mobile robot may then align its magnetic charging contacts with the magnetic charging contacts of the charging station disposed on the extended prongs. The direction of the poles of magnetic charging contacts on the prongs is irrelevant, so long as they are opposite the poles of corresponding magnetic charging contacts of the mobile robot. This ensures that the magnetic charging contacts of the charging station attract corresponding magnetic charging contacts of the mobile robot resulting in a strong and steady connection between the charging contacts of the mobile robot and charging station. In the preferred embodiment, a gearbox is used to retract and extend the prongs of the charging station. In another embodiment, a solenoid is used to retract and extend the prongs of the charging station.

Figure 1A:
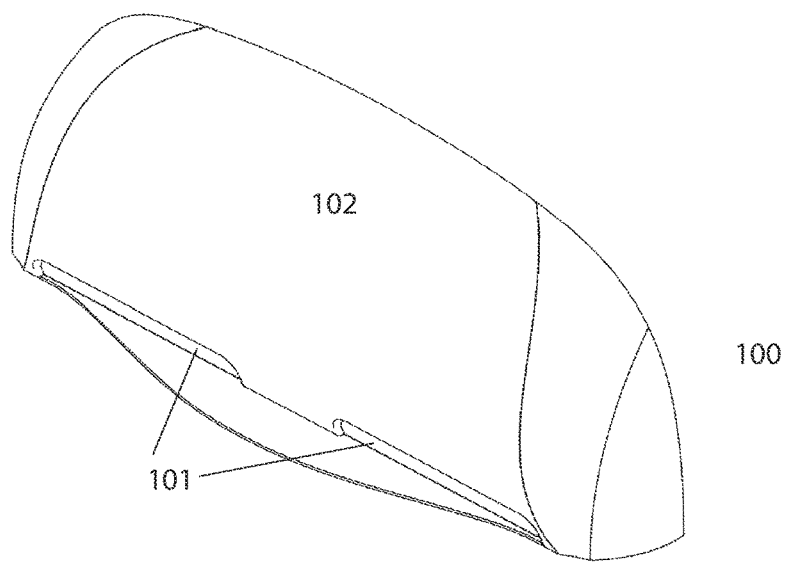
FIG. 1A illustrates a perspective view of a charging station with retracted prongs onto which charging contacts are disposed embodying features of the present invention.
Figure 1B:
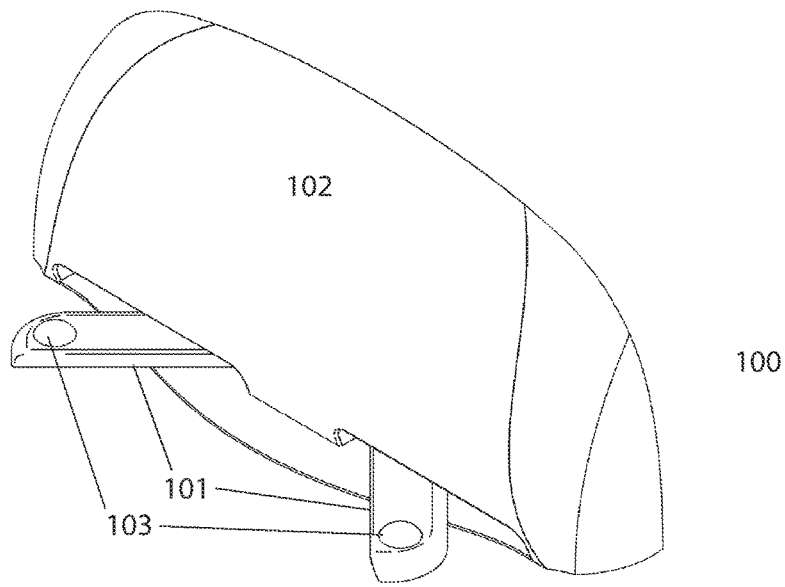
FIG. 1B illustrates a perspective view of a charging station with extending prongs onto which charging contacts are disposed embodying features of the present invention.
Figure 1C:
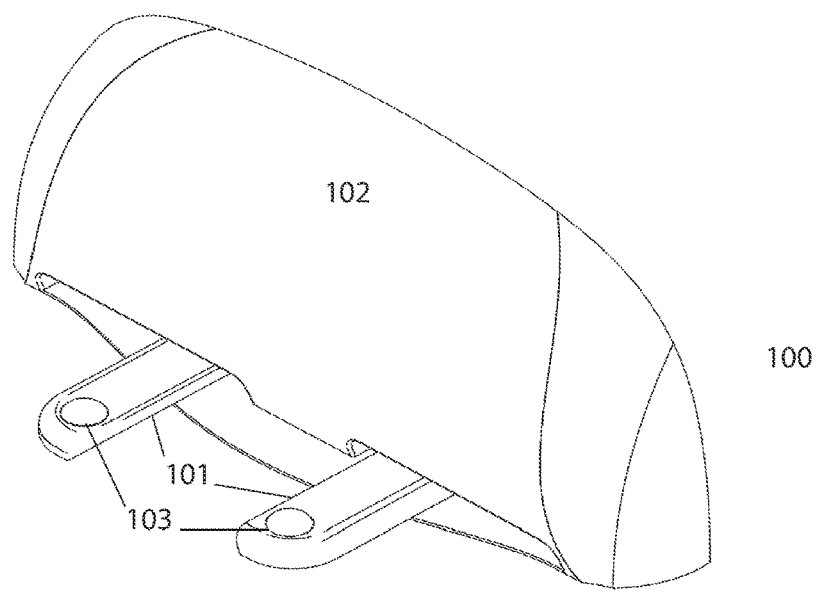
FIG. 1C illustrates a perspective view of a charging station with fully extended prongs onto which charging contacts are disposed embodying features of the present invention.

Referring to FIG. 1A, a perspective view of charging station 100 with prongs 101 retracted within main housing 102 of charging station 100 is illustrated. In this preferred embodiment, the prongs retract and extend by rotating about a vertical axis such that the prongs lie in a horizontal plane. Referring to FIG. 1B, a perspective view of charging station 100 with charging contacts 103 disposed on prongs 101 in the process of extending is illustrated. In FIG. 1C, prongs 101 are fully extended such that a mobile robot is able to charge its battery by positioning its charging contacts over charging contacts 103 disposed on prongs 101 of charging station 100.

Figure 2A:
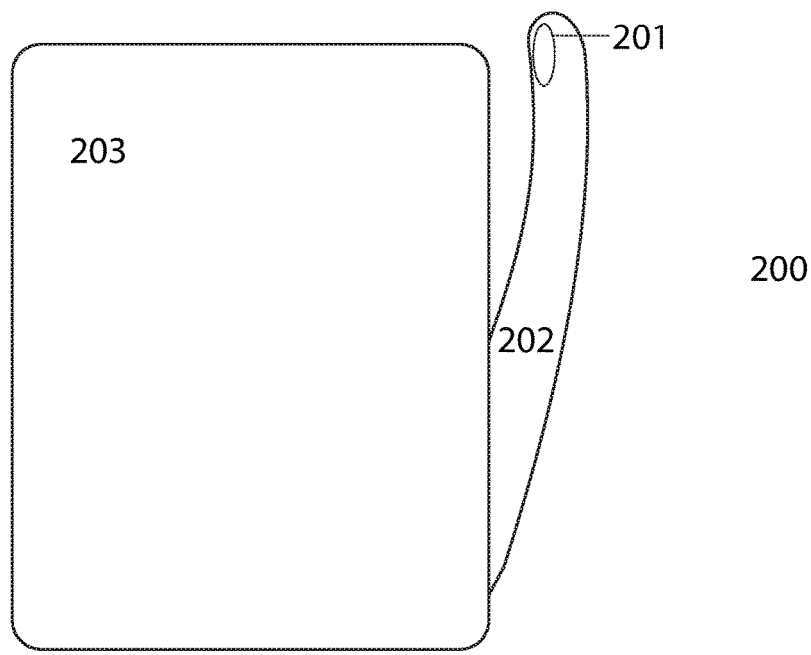
FIG. 2A illustrates a side view of a charging station with retracted prongs onto which charging contacts are disposed embodying features of the present invention.
Figure 2B:
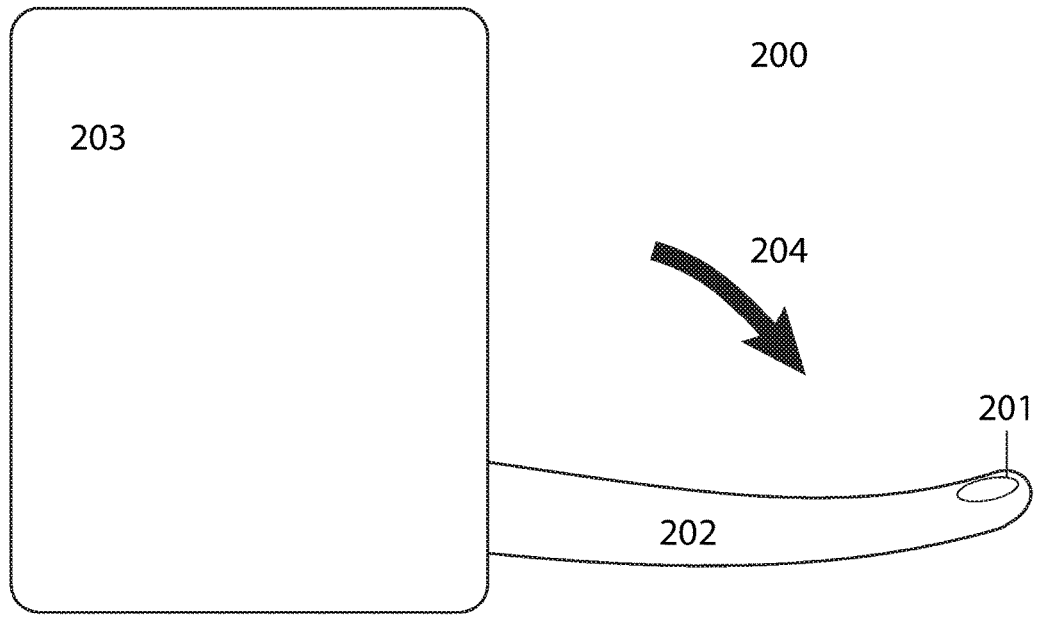
FIG. 2B illustrates a side view of a charging station with extending prongs onto which charging contacts are disposed embodying features of the present invention.

Referring to FIG. 2A, another exemplary embodiment of the present invention is illustrated, wherein the prongs retract and extend by rotating about a horizontal axis such that the prongs lie in a vertical plane. A side view of charging station 200 with charging contacts 201 disposed on retracted prongs 202 is shown. In this embodiment, prongs 202 do not retract within main housing 203 of charging station 200. Referring to FIG. 2B, a side view of charging station 200 with charging contacts 201 disposed on fully extended prongs 202 is illustrated. Prong 202 rotate about a horizontal axis in direction 204 when retracting and extending. In this position, a mobile robot is able to charge its battery by positioning its charging contacts over charging contacts 201 disposed on prongs 202 of charging station 200.

Figure 3A:
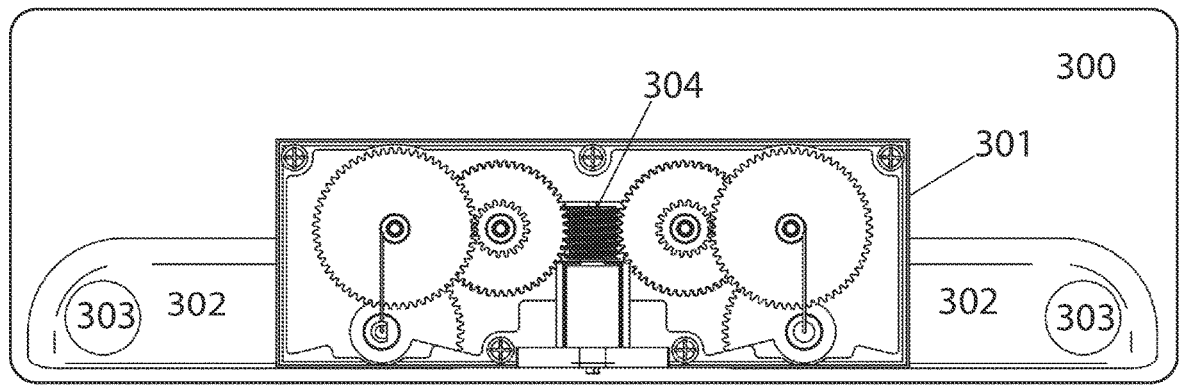
FIG. 3A illustrates a cross-section top view of a gearbox mechanism used for retracting prongs within the main housing of a charging station embodying features of the present invention.
Figure 3B:
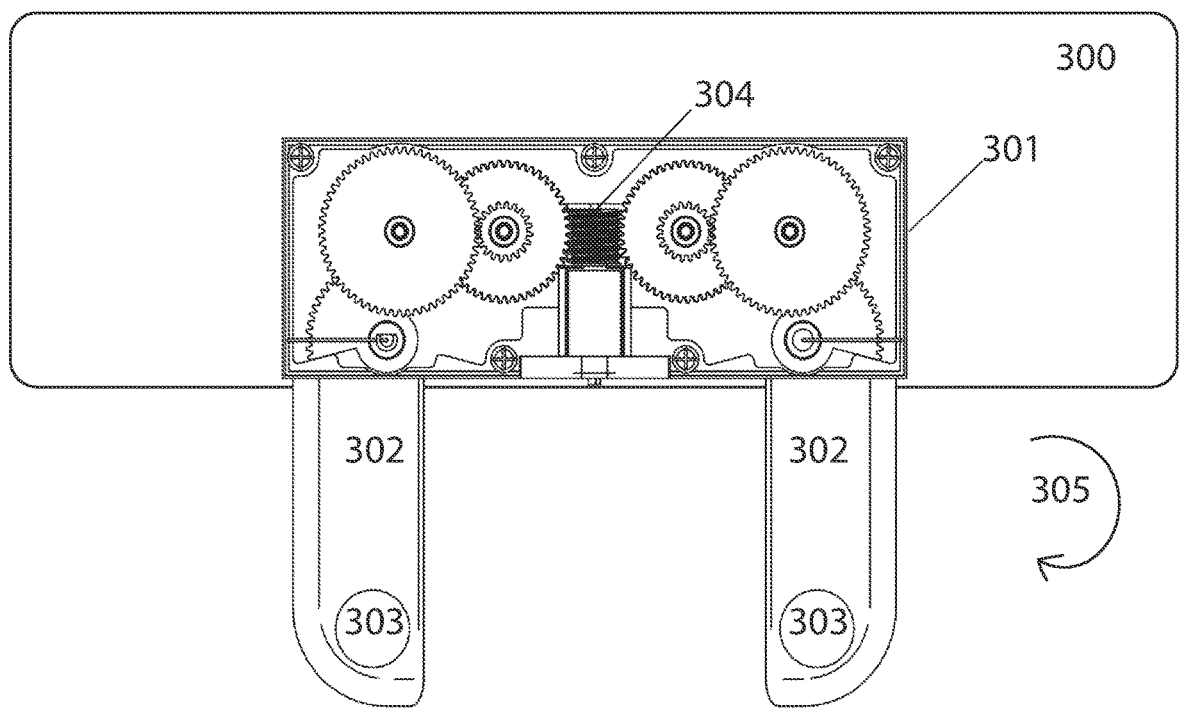
FIG. 3B illustrates a cross-section top view of a gearbox mechanism used for extending prongs outside the main housing of a charging station embodying features of the present invention.

Referring to FIG. 3A, a cross-sectional top view of charging station 300 showing an example internal gearbox which could potentially be utilized for prong extension and retraction is displayed 301 with connected prongs 302 upon which charging contacts 303 are disposed is illustrated. In this preferred embodiment, the mechanism used to retract and extend prongs 302 is gearbox 301. Worm 304 of gearbox 301 is press fit onto a motor shaft (not shown) such that worm 304 rotates when the motor shaft rotates. When worm 304 rotates, the meshed gears of gearbox 301 rotate which causes connected prongs 302 to subsequently rotate and extend or retract, depending on the direction of rotation of the motor shaft. When charging station 300 is not in charging mode, gearbox 301 is inactive and prongs 302 are retracted within charging station 300. Referring to FIG. 3B, prongs 302 are fully extended. When charging station 300 enters charging mode, gear box 301 is activated and motor shaft and connected worm 304 rotate the gears such that prongs 302 rotate in direction 305 to extend for charging. Once charging mode ceases, gear box 301 is deactivated and motor shaft and connected worm 304 rotate gears such that prongs 302 rotate in a direction opposite 305 to retract within charging station 300. In another embodiment, gear box 301 is used to retract and extend prongs rotating about a horizontal axis such that each prong lies in a vertical plane. In another embodiment, prongs 302 are external to charging station 300 when retracted. Other variations are possible and this iteration of the internal mechanism should not be construed as the charging station being limited to this internal mechanism.

Figure 4A:
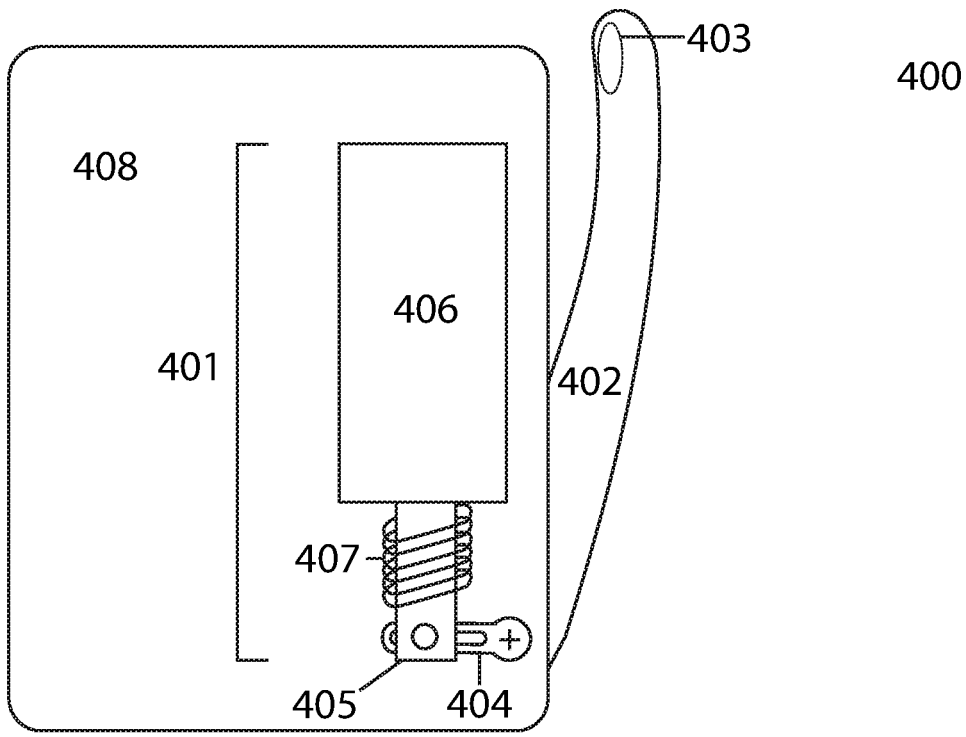
FIG. 4A illustrates a cross-section side view of a solenoid mechanism used for retracting prongs of a charging station embodying features of the present invention.
Figure 4B:
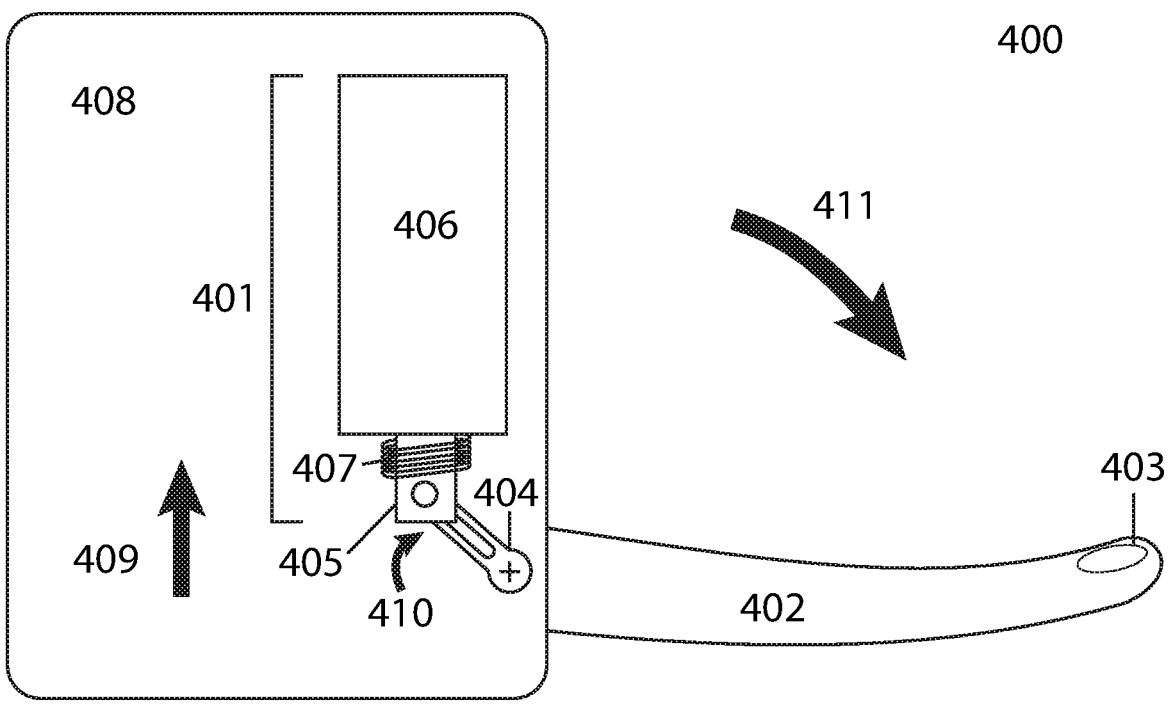
FIG. 4B illustrates a cross-section top view of a solenoid mechanism used for extending prongs of a charging station embodying features of the present invention.

Referring to FIG. 4A, a cross-sectional side view of charging station 400 showing an example internal solenoid which could potentially be utilized for prong extension and retraction is displayed 401 is illustrated. In this alternate embodiment, the mechanism used to retract and extend prongs 402 onto which charging contacts 403 are disposed is solenoid 401. Prongs 402 are attached to solenoid 401 by axle 404 with a slotted arm. Solenoid 401 comprises plunger 405, main body 406, and spring 407. When charging station 400 is not in charging mode, solenoid 401 is inactive and plunger 405 is positioned outside main body 406 and prongs 402 are retracted and stored external to main housing 408 of charging station 400. Referring to FIG. 2B, prongs 402 are fully extended. When charging station 400 enters charging mode, solenoid 401 is activated and plunger 405 retracts in direction 409 into main body 406 of solenoid 401, which causes spring 407 to compress and axle 404 to rotate in direction 410 thereby extending connected prongs 402 in direction 411. Once charging mode ceases, solenoid 401 is deactivated, spring 407 decompresses forcing plunger 405 out of main body 406 of solenoid 401 and back to its inactive position. As plunger 405 moves back to its inactive position it causes axle 404 to rotate in a direction opposite 411 such that connected prongs 402 retract. In another embodiment, solenoid mechanism 401 is used to retract and extend prongs rotating about a vertical axis such that the prongs lie in a horizontal plane. In another embodiment, prongs 402 are housed within main housing 408 of charging station 400 when retracted. In yet another embodiment, a construction with two solenoids, each solenoid connected to one prong of the pair of prongs by an axle is used. Other variations are possible and this iteration of the internal mechanism should not be construed as the charging station being limited to this internal mechanism.

Figure 5A:
FIG. 5A illustrates a top view of a mobile robot outside the range of a RF receiver disposed on a charging station embodying features of the present invention.
Figure 5B:
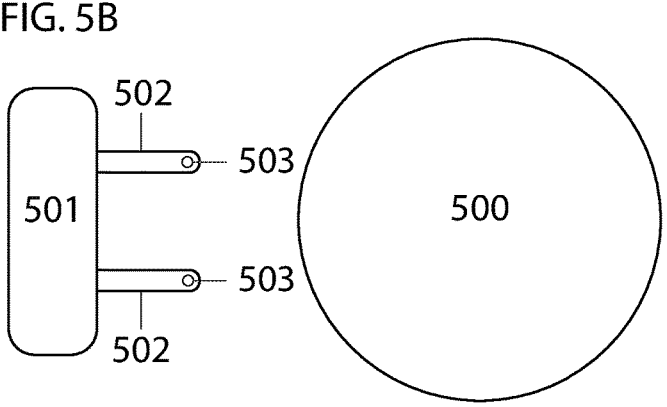
FIG. 5B illustrates a top view of a mobile robot within the range of a RF receiver disposed on a charging station embodying features of the present invention.
Figure 5C:
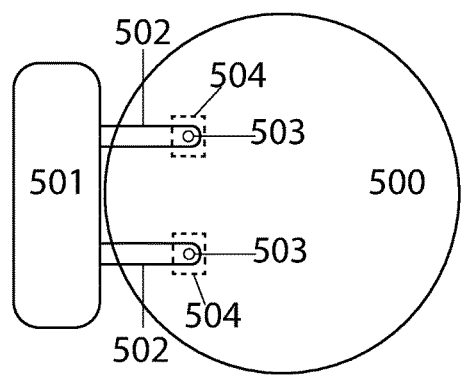
FIG. 5C illustrates a top view of charging contacts of a mobile robot connected with charging contacts of a charging station embodying features of the present invention.

In the preferred embodiment, the charging station further comprises a radio frequency receiver for receiving signals transmitted by an RF transmitted disposed on a mobile robot. When a mobile robot emitting an omnidirectional radio signal approaches within the range of the radio frequency receiver, the receiver detects the signals and thereby the presence of the robot. Once the mobile robot is detected by the charging station it enters charging mode which activates the mechanism used to retract and extend the prongs causing the prongs to extend for charging. When the mobile robot is no longer detected by the charging station, charging mode is ceased which deactivates the mechanism used to retract and extend the prongs causing the prongs to retract. This is illustrated in FIGS. 5A, 5B and 5C. Referring to FIG. 5A, mobile robot 500 is a distance away from charging station 501. Prongs 502 are retracted as mobile robot 500 is not within range of the signal receiver (not illustrated) on charging station 501. Referring to FIG. 5B, mobile robot 500 is in close proximity to charging station

501. Prongs 502, onto which magnetic charging contacts 503 are disposed, are extended as the signal receiver (not illustrated) on charging station 501 can detect the signal of approaching mobile robot 500. Referring to FIG. 5C, mobile robot 500 with magnetic charging contacts 504 on the underside thereof has positioned its charging contacts 504 above magnetic charging contacts 503 of charging station 500 for charging. Magnetic charging contacts 504 of mobile robot 500 are of opposite poles to corresponding magnetic charging contacts 503 of charging station 501 such that they attract one another to ensure steady strong contact for charging.

In another embodiment, wherein a solenoid is used as the mechanism to retract and extend the prongs, the solenoid is active for a preset period of time after the charging station detects the robot radio signals. Once the preset time period has passed the solenoid becomes inactive and the spring will decompress and cause the prongs to retract. If the mobile robot is positioned over the prongs when the preset time period has been reached, the weight of the mobile robot keeps the prongs in their extended position despite the force of the spring acting to decompress. The force of the spring acting to decompress while a mobile robot is positioned over the prongs may cause the prongs to lift slightly and apply pressure against the charging contacts of the mobile robot thereby providing a stable and strong connection. When the mobile robot drives off of the prongs, the spring will decompress and cause the prongs to retract.

A charging station with retractable prongs is not intended as being limited in applicability for particular types of robotic devices. A multitude of types of different robotic devices can utilize charging stations with retractable prongs. For example, robotic cleaning devices, towing devices, devices that can carry and transport any type of payload, security devices, vehicle valet devices, waiter devices, shopping cart devices, refuse container devices, and the like.

In an alternative embodiment, a single charging station with retractable prongs can be utilized for the charging of multiple different types of robotic devices.

This invention is not intended to be limited in scope to the use of charging contacts being located on two prongs which extend away from the body of the charging station. In another embodiment, the magnetic contacts will extend away from the body of the charging station in a configuration other than that of two prongs. For example, one prong may contain both contacts, three or more prongs may be utilized, an overall large flap may extend away from the body of the charging station which contains all charging contacts on it, and the like.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

We claim:

1. A charging station for a mobile robot comprising:
   a housing including two retractable and extendable prongs;
   a set of charging contacts on the terminal ends of the prongs oriented such that the charging contacts face upward when the prongs are extended;
   a mechanism for controlling the extension and retraction of the prongs; and
   a signal receiver;
   wherein:
   the charging station detects the mobile robot approaching upon receiving signals by the signal receiver of the charging station from a signal transmitter of the mobile robot and in response extends the prongs; and
   the charging station detects an absence of the mobile robot when the signal receiver of the charging station does not detect the signals from the signal transmitter of the mobile robot and in response retracts the prongs.

2. The charging station of claim 1, wherein the charging contacts of the charging station are magnetic.

3. The charging station of claim 1, wherein the prongs are stored within the main housing of the charging station when retracted.

4. The charging station of claim 1, wherein the prongs are stored external to the main housing of the charging station when retracted.

5. The charging station of claim 1, wherein the prongs rotate about a vertical axis to retract and extend.

6. The charging station of claim 1, wherein the prongs rotate about a horizontal axis to retract and extend.

7. The charging station of claim 1, wherein the prongs slide forwards and backwards to retract and extend.

8. The charging station of claim 1, wherein the charging station utilizes one prong.

9. The charging station of claim 1, wherein the charging station utilizes three or more prongs.

10. The charging station of claim 1, wherein the charging station utilizes one overall flap containing all charging contacts on it.

11. The charging station of claim 1, wherein the prongs remain extended for a predetermined amount of time upon detection of an approaching mobile robot.

12. A method for charging a mobile robot comprising:
    a charging station with retractable prongs, onto which charging contacts are disposed, detecting an approaching mobile robot upon receiving signals by a signal receiver of the charging station from a signal transmitter of the mobile robot;
    the charging station extending the prongs upon detecting the approaching mobile robot such that the charging contacts face upward when the prongs are extended;
    the mobile robot positioning its charging contacts over the charging contacts disposed onto the prongs of the charging station;
    charging the mobile robot's battery; and
    the charging station detecting an absence of the mobile robot when the signal receiver of the charging station does not detect the signals from the signal transmitter of the mobile robot and in response the charging station retracting the prongs.

13. The method of claim 12, wherein the charging contacts of the charging station are magnetic.

14. The method of claim 12, wherein the charging contacts of the mobile robot are magnetic.

15. The method of claim 12, wherein the prongs are stored within the main housing of the charging station when retracted.

16. The method of claim 12, wherein the prongs are stored external to the main housing of the charging station when retracted.

17. The method of claim 12, wherein the prongs rotate about a vertical axis to retract and extend.

18. The method of claim 12, wherein the prongs rotate about a horizontal axis to retract and extend.

19. The method of claim 12, wherein the prongs slide forwards and backwards to retract and extend.

20. The method of claim 12, wherein the prongs remain extended for a predetermined amount of time upon detection of an approaching mobile robot.

21. The method of claim 12, wherein the charging station utilizes one prong.

22. The method of claim 12, wherein the charging station utilizes two or more prongs.

23. The method of claim 12, wherein the charging station utilizes one overall flap containing the charging contacts on it.

24. The method of claim 12, wherein the signals are radio frequency signals.

\* \* \* \* \*